US011270509B2

(12) United States Patent
Saravanan et al.

(10) Patent No.: US 11,270,509 B2
(45) Date of Patent: Mar. 8, 2022

(54) METHOD AND SYSTEM FOR ONBOARDING USERS FOR FINANCIAL INSTITUTIONS USING VIRTUAL REALITY AND AUGMENTED REALITY

(71) Applicant: Signzy Technologies Private Limited, Mumbai (IN)

(72) Inventors: Aadalarasan Bhavani Saravanan, Mumbai (IN); Shiv Shankar Subudhi, Mumbai (IN); Chitrangada Patra, Mumbai (IN); Dinesh Avula, Mumbai (IN); Ankit Ratan, Mumbai (IN); Arpit Ratan, Mumbai (IN); Ankur Pandey, Mumbai (IN)

(73) Assignee: Signzy Technologies Private Limited, Mumbai (IN)

( * ) Notice: Subject to any disclaimer, the term of this patent is extended or adjusted under 35 U.S.C. 154(b) by 0 days.

(21) Appl. No.: 17/126,040

(22) Filed: Dec. 18, 2020

(65) Prior Publication Data

US 2022/0028167 A1    Jan. 27, 2022

(51) Int. Cl.
*G06T 19/20* (2011.01)
*G06T 19/00* (2011.01)
*G06Q 40/02* (2012.01)
*G06Q 30/00* (2012.01)

(52) U.S. Cl.
CPC ......... *G06T 19/003* (2013.01); *G06Q 30/016* (2013.01); *G06Q 40/02* (2013.01); *G06T 19/006* (2013.01)

(58) Field of Classification Search
CPC .... G06T 19/003; G06T 19/006; G06Q 30/016
USPC ......................................................... 345/419
See application file for complete search history.

(56) References Cited

U.S. PATENT DOCUMENTS

| | | | |
|---|---|---|---|
| 8,712,804 B2* | 4/2014 | Wottowa | G06Q 20/10 705/4 |
| 10,572,727 B1* | 2/2020 | Sachtleben | G06K 9/00456 |
| 10,909,618 B1* | 2/2021 | Mortensen | G06Q 20/10 |

* cited by examiner

*Primary Examiner* — Thomas J Lett
(74) *Attorney, Agent, or Firm* — Kolisch Hartwell, P.C.

(57) ABSTRACT

The present disclosure provides a computer-implemented method and system for onboarding users for financial institutions using virtual reality and augmented reality. The computer-implemented method and system corresponds to a visualization based onboarding system. The visualization based onboarding system collects a first set of data. The visualization based onboarding system obtains a second set of data. The visualization based onboarding system receives a third set of data. The visualization based onboarding system maps the first set of data associated with one or more institution environment essentials, the second set of data associated with a plurality of architectural information, and the third set of data associated with a plurality of financial services. The visualization based onboarding system creates a virtual reality and augmented reality model. The visualization based onboarding system allows a plurality of users to navigate inside the virtual reality and augmented reality model of one or more financial institutions.

20 Claims, 4 Drawing Sheets

100

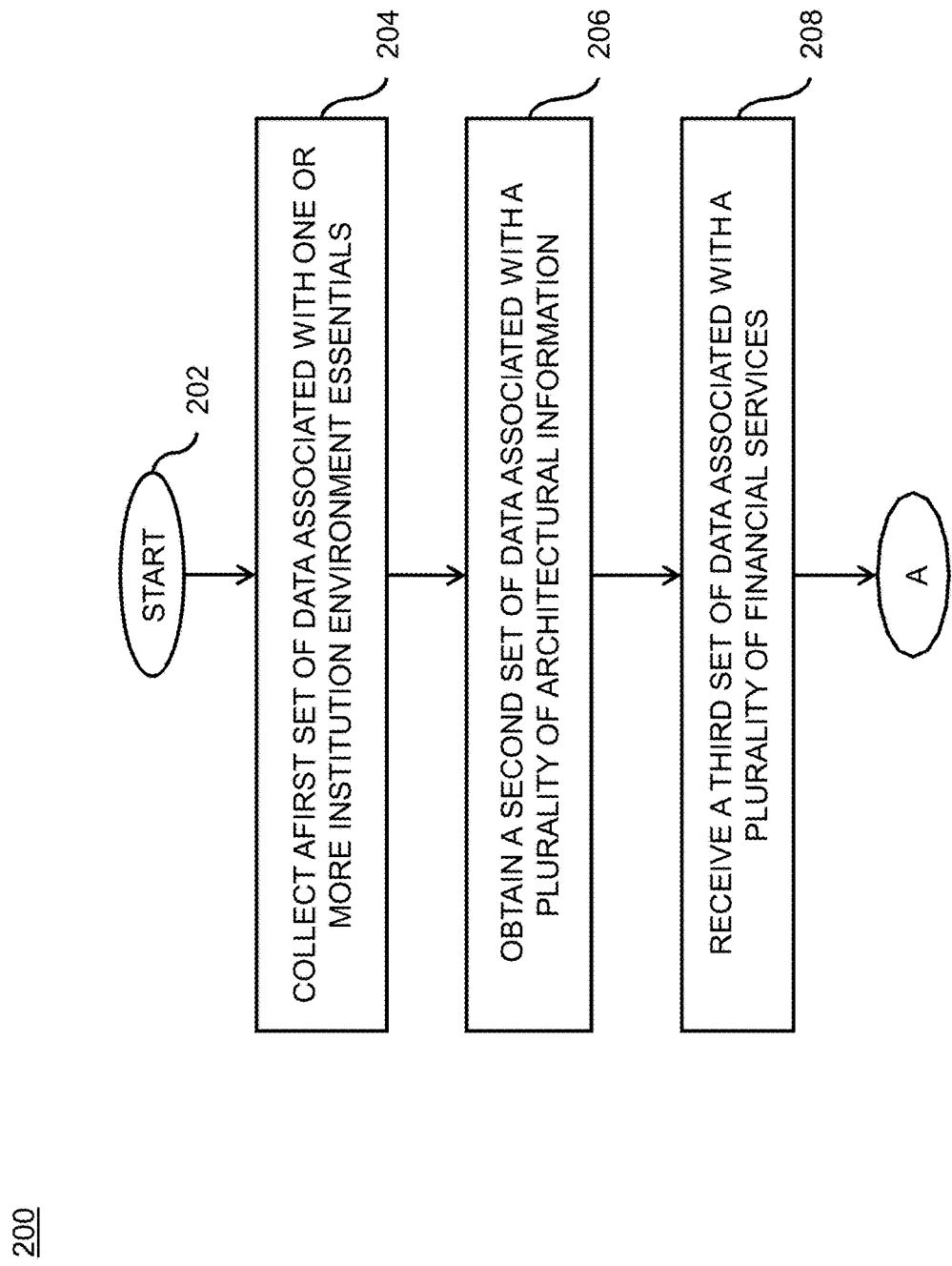

METHOD AND SYSTEM FOR ONBOARDING USERS FOR FINANCIAL INSTITUTIONS USING VIRTUAL REALITY AND AUGMENTED REALITY

TECHNICAL FIELD

The present invention relates to the field of financial technologies and, in particular, relates to a method and system for onboarding users for financial institutions using virtual reality and augmented reality.

INTRODUCTION

Over the past few years, financial institutions are continuously providing financial services to customers for performing monetary transactions. The customers interacting with the financial institutions are growing at a rapid rate. Generally, the customers have to personally visit the financial institutions for seeking financial services during week-days. Further, the customers sign up for various financial products and services offered by the financial institutions such as deposits, loans, investments, and currency exchange. The customers interact with financial employees in the financial institutions for receiving the financial services. The financial institutions have to keep user records for the various financial services in the form of papers. The financial institutions are seeking effective ways to onboard customers. In addition, the financial institutions seek to reduce efforts of the customers. However, the present systems and methods of the interaction of the customers with the financial institutions are time consuming and exerting. In addition, the present systems and methods do not allow the financial institutions to have a colossal customer base. Further, the present systems and methods do not allow the customers to sign up for various financial services in real-time.

SUMMARY

In a first example, a computer-implemented method is provided. The computer-implemented method for onboarding users for financial institutions using virtual reality and augmented reality. The computer-implemented method includes a first step to collect a first set of data associated with one or more institution environment essentials. In addition, the computer-implemented method includes a second step to obtain a second set of data associated with a plurality of architectural information of one or more financial institutions. Further, the computer-implemented method includes a third step to receive a third set of data associated with a plurality of financial services of the one or more financial institutions. Furthermore, the computer-implemented method includes a fourth step to map the first set of data associated with the one or more institution environment essentials, the second set of data associated with the plurality of architectural information and the third set of data associated with the plurality of financial services. Moreover, the computer-implemented method includes a fifth step to create a virtual reality and augmented reality model using a virtual reality and augmented reality representation of the one or more financial institutions. The computer-implemented method includes a sixth step to allow a plurality of users to navigate inside the virtual reality and augmented reality model of the one or more financial institutions. The one or more institution environment essentials are collected from a plurality of media devices with one or more properties. The plurality of media devices is associated with the one or more financial institutions. The first set of data is collected in real-time. The plurality of architectural information of the one or more financial institutions is obtained from the plurality of media devices. The second set of data is obtained in real-time. The plurality of financial services of the one or more financial institutions is received from the plurality of media devices. The third set of data is received in real-time. The virtual reality and augmented reality model is created for interaction of the plurality of users with the one or more financial institutions. The plurality of users is associated with one or more communication devices and a plurality of virtual reality and augmented reality devices. The virtual reality and augmented reality model is based on the first set of data, the second set of data and the third set of data. The virtual reality and augmented reality model is created in real-time. The navigation facilitates the plurality of users to access the one or more services offered by the one or more financial institutions on the plurality of virtual reality and augmented reality devices. The plurality of virtual reality and augmented reality devices allows interaction, navigation and customization of the virtual reality and augmented reality model of the one or more financial institutions in real-time.

In an embodiment of the present disclosure, the first set of data is associated with the one or more institution environment essentials. In addition, the first set of data includes wall units, wall finishing, roofing, basic building, electrical connections, electronic components, flooring, doors, service counters, furniture, paints, sanitary fittings, physical items, decorative and hardware.

In an embodiment of the present disclosure, the one or more properties are associated with the one or more institution environment essentials. The one or more properties include brand, model, size, colour, type, finish, weight, quality, material, specifications, designs, shapes, and dimensions.

In an embodiment of the present disclosure, the second set of data is associated with the plurality of architectural information of the one or more financial institutions. The plurality of architectural information of the one or more financial institutions includes building information modelling documents, blueprint, layout, pattern information, framing plan, sub-floor plan, roof plans, specification drawings, two dimensional orthogonal projections of financial institute, sections, elevations, interior plan, and exterior plan.

In an embodiment of the present disclosure, the third set of data is associated with the plurality of financial services of the one or more financial institutions. The third set of data includes general enquiry services, car loan services, house loan services, education loan services, net banking services, commercial banking services, opening saving accounts, home equity, stock exchange investment, opening accounts, documents verification services, overdraft facility, credit card services, fixed deposit services, health insurance services, personal accident insurance, retirement plan services, and risk management services.

In an embodiment of the present disclosure, the computer-implemented method further projects a real environment of the one or more financial institutions on the plurality of virtual reality and augmented reality devices as a three-dimensional virtual space. The each of the plurality of users experiences the real environment of the one or more financial institutions on the plurality of virtual reality and augmented reality devices as the three-dimensional virtual space.

In an embodiment of the present disclosure, the plurality of virtual reality and augmented reality devices includes a wearable device and a handheld device. In addition, the wearable device provides the virtual reality and augmented reality representation as the three-dimensional virtual space to the plurality of users. Further, the handheld device allows the plurality of users to interact and navigate the three-dimensional virtual space and the plurality of financial services inside the virtual reality and augmented reality representation of the one or more financial institutions in real-time.

In an embodiment of the present disclosure, each of the plurality of users accesses the plurality of financial services associated with the one or more financial institutions. In addition, the plurality of financial services is accessed by the plurality of users on the plurality of virtual reality and augmented reality devices projecting the real environment as the three-dimensional virtual space. Further, the plurality of users uploads a plurality of documents required for onboarding process for the one or more financial institutions in real time. Furthermore, the plurality of documents includes proof of identity, proof of address, photographs, online banking forms, proof of age, and proof of income source. The plurality of users navigates inside the virtual reality and augmented reality representation to upload the plurality of documents on the plurality of virtual reality and augmented reality devices.

In an embodiment of the present disclosure, the plurality of virtual reality and augmented reality devices is interconnected with the one or more communication devices. The plurality of users uploads the plurality of documents through the one or more communication devices while navigating the virtual reality and augmented reality representation and interacting with the plurality of financial services.

In an embodiment of the present disclosure, the plurality of users interacts with a plurality of financing officials working in the one or more financial institutions using augmented reality concept similar to the real environment in the virtual reality and augmented reality representation on the plurality of virtual reality and augmented reality devices.

In a second example, a computer system is provided. The computer system includes one or more processors, a signal generator circuitry embedded inside a computing device for generating a signal, and a memory. The memory is coupled to the one or more processors. The memory stores instructions. The instructions are executed by the one or more processors. The execution of the instructions causes the one or more processors to perform a method for onboarding users for financial institutions using virtual reality and augmented reality. The method corresponds to a visualization based onboarding system. The method includes a first step to collect a first set of data associated with one or more institution environment essentials. In addition, the method includes a second step to obtain a second set of data associated with a plurality of architectural information of one or more financial institutions. Further, the method includes a third step to receive a third set of data associated with a plurality of financial services of the one or more financial institutions. Furthermore, the method includes a fourth step to map the first set of data associated with the one or more institution environment essentials, the second set of data associated with the plurality of architectural information and the third set of data associated with the plurality of financial services. Moreover, the method includes a fifth step to create a virtual reality and augmented reality model using a virtual reality and augmented reality representation of the one or more financial institutions. The method includes a sixth step to allow a plurality of users to navigate inside the virtual reality and augmented reality model of the one or more financial institutions. The one or more institution environment essentials are collected from a plurality of media devices with one or more properties. The plurality of media devices is associated with the one or more financial institutions. The first set of data is collected in real-time. The plurality of architectural information of the one or more financial institutions is obtained from the plurality of media devices. The second set of data is obtained in real-time. The plurality of financial services of the one or more financial institutions is received from the plurality of media devices. The third set of data is received in real-time. The virtual reality and augmented reality model is created for interaction of the plurality of users with the one or more financial institutions. The plurality of users is associated with one or more communication devices and a plurality of virtual reality and augmented reality devices. The virtual reality and augmented reality model is based on the first set of data, the second set of data and the third set of data. The virtual reality and augmented reality model is created in real-time. The navigation facilitates the plurality of users to access the one or more services offered by the one or more financial institutions on the plurality of virtual reality and augmented reality devices. The plurality of virtual reality and augmented reality devices allows interaction, navigation and customization of the virtual reality and augmented reality model of the one or more financial institutions in real-time.

In a third example, a non-transitory computer-readable storage medium is provided. The non-transitory computer-readable storage medium encodes computer executable instructions that, when executed by at least one processor, performs a method for onboarding users for financial institutions using virtual reality and augmented reality. The method includes a first step to collect a first set of data associated with one or more institution environment essentials. In addition, the method includes a second step to obtain a second set of data associated with a plurality of architectural information of one or more financial institutions. Further, the method includes a third step to receive a third set of data associated with a plurality of financial services of the one or more financial institutions. Furthermore, the method includes a fourth step to map the first set of data associated with the one or more institution environment essentials, the second set of data associated with the plurality of architectural information and the third set of data associated with the plurality of financial services. Moreover, the method includes a fifth step to create a virtual reality and augmented reality model using a virtual reality and augmented reality representation of the one or more financial institutions. The method includes a sixth step to allow a plurality of users to navigate inside the virtual reality and augmented reality model of the one or more financial institutions. The one or more institution environment essentials are collected from a plurality of media devices with one or more properties. The plurality of media devices is associated with the one or more financial institutions. The first set of data is collected in real-time. The plurality of architectural information of the one or more financial institutions is obtained from the plurality of media devices. The second set of data is obtained in real-time. The plurality of financial services of the one or more financial institutions is received from the plurality of media devices. The third set of data is received in real-time. The virtual reality and augmented reality model is created for interaction of the plurality of users with the one or more financial institutions. The plurality of users is associated with one or more communication devices and a plurality of virtual reality and augmented reality devices. The virtual reality and augmented reality model is based on the first set of data, the second set of data and the third set of data. The virtual reality and augmented reality model is created in real-time. The navigation facilitates the plurality of users to access the one or more services offered by the one or more financial institutions on the plurality of virtual reality and augmented reality devices. The plurality of virtual reality and augmented reality devices allows interaction, navigation and customization of the virtual reality and augmented reality model of the one or more financial institutions in real-time.

BRIEF DESCRIPTION OF THE DRAWINGS

Figure 1:
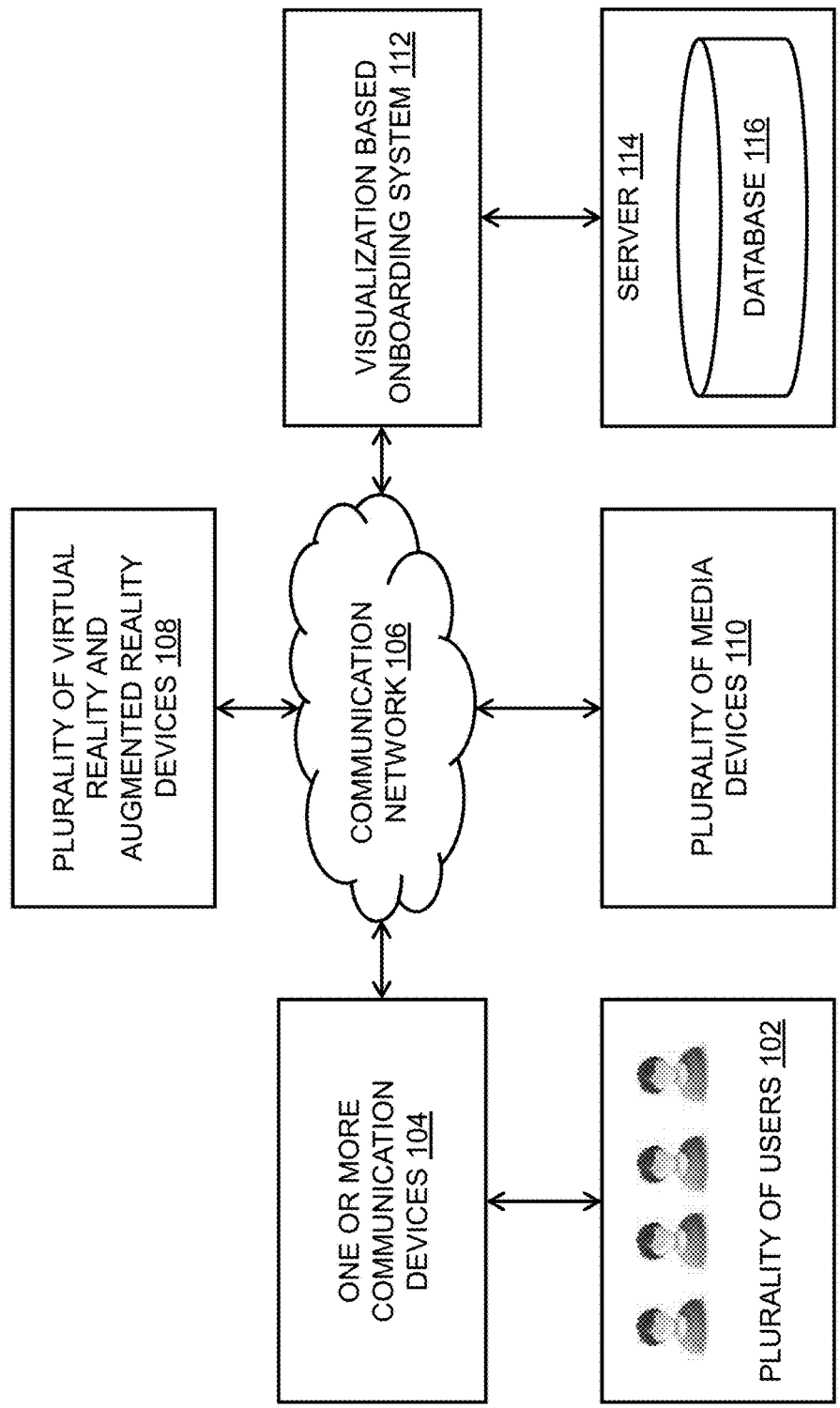
Figure 2B:
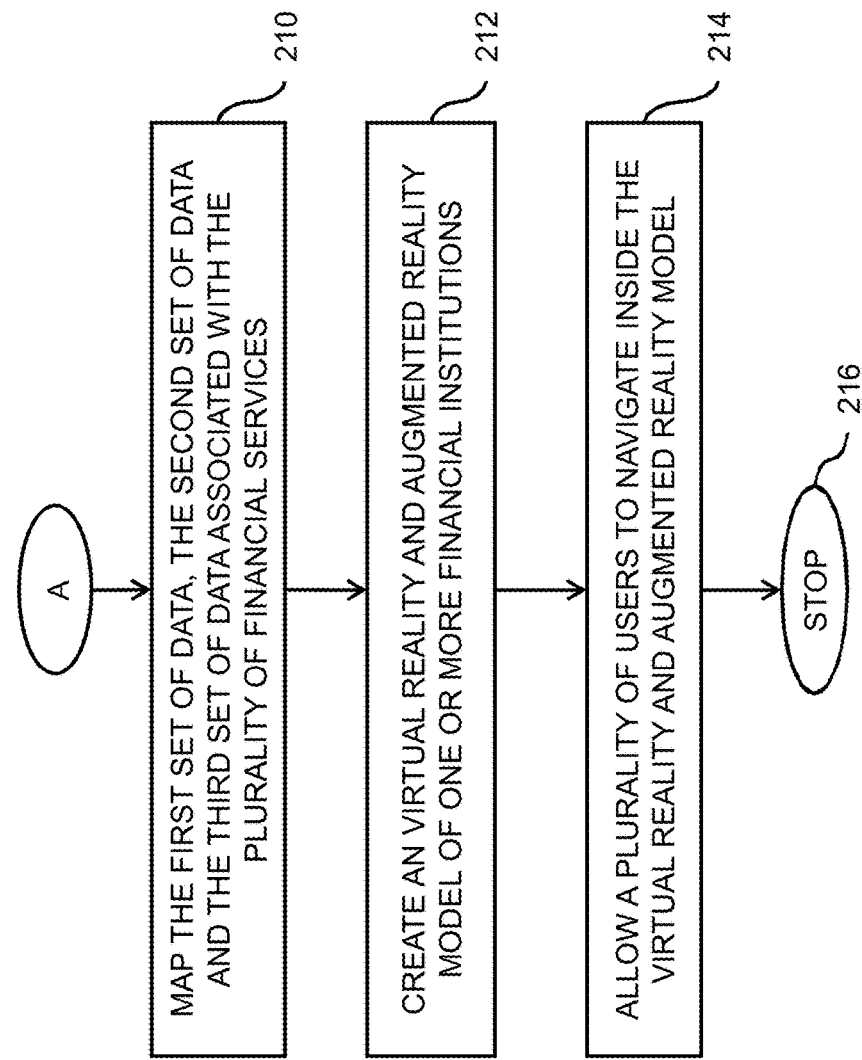
Figure 3:
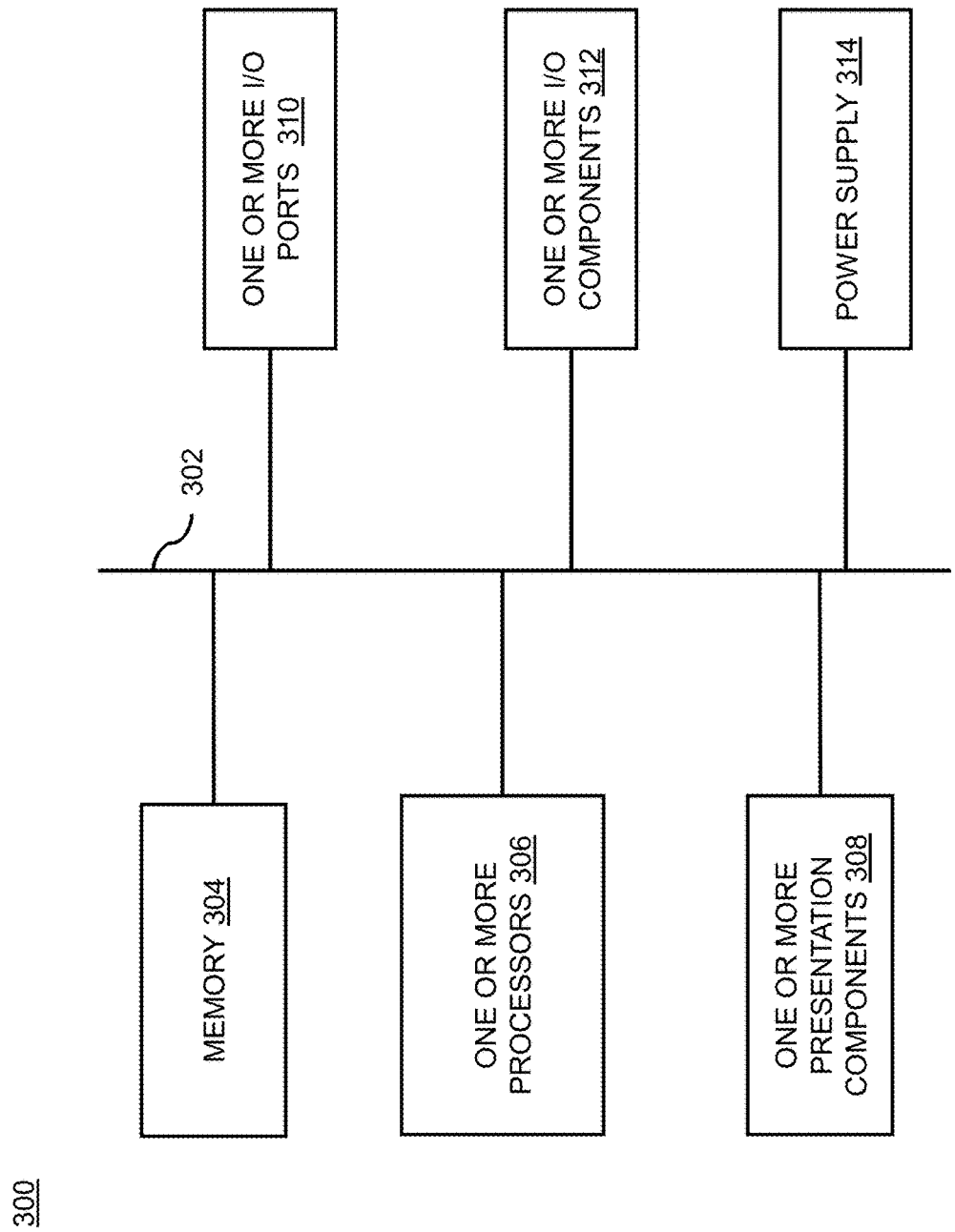

Having thus described the invention in general terms, reference will now be made to the accompanying drawings, which are not necessarily drawn to scale, and wherein:

FIG. 1 illustrates an interactive computing environment for onboarding of users for financial institutions using virtual reality and augmented reality, in accordance with various embodiments of the present disclosure;

FIGS. 2A and 2B illustrate a flowchart for onboarding of users for financial institutions using virtual reality and augmented reality, in accordance with various embodiments of the present disclosure; and FIG. 3 illustrates a block diagram of a computing device, in accordance with various embodiments of the present disclosure.

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

It should be noted that the terms "first", "second", and the like, herein do not denote any order, quantity, or importance, but rather are used to distinguish one element from another. Further, the terms "a" and "an" herein do not denote a limitation of quantity, but rather denote the presence of at least one of the referenced item.

FIG. 1 illustrates an interactive computing environment 100 for onboarding of users for financial institutions using virtual reality and augmented reality, in accordance with various embodiments of the present disclosure. The interactive computing environment 100 includes a plurality of users 102, one or more communication devices 104, a communication network 106, and a plurality of virtual reality and augmented reality devices 108. In addition, the interactive computing environment 100 includes a plurality of media devices 110, a visualization based onboarding system 112, a server 114, and a database 116. The above stated elements of the interactive computing environment 100 operate coherently and synchronously to enable onboarding of the plurality of users 102 for financial institutions using virtual reality and augmented reality of in real-time.

The interactive computing environment 100 includes the plurality of users 102 who is any person present at any location and accessing a plurality of financial services. In addition, the plurality of financial services is associated with one or more financial institutions. In general, the one or more financial institutions are institutions engaged in business of dealing with financial and monetary transactions such as deposits, loans, investments, and currency exchange. In an example, the plurality of financial services includes general enquiry services, car loan services, house loan services, education loan services, net banking services, commercial banking services, and the like. In another example, the plurality of financial services includes opening saving accounts, home equity, stock exchange investment, opening accounts, documents verification services, and the like. In yet another example, the plurality of financial services include overdraft facility, credit card services, fixed deposit services, health insurance services, personal accident insurance, retirement plan services, risk management services, and the like.

The interactive computing environment 100 includes the plurality of users 102. In addition, the plurality of users 102 is an individual or person who access a virtual reality and augmented reality model of the one or more financial institutions for the plurality of financial services. Further, the plurality of users 102 accesses the virtual reality and augmented reality model through the one or more communication devices 104 and the plurality of virtual reality and augmented reality devices 108. The plurality of users 102 is associated with the one or more communication devices 104 and the plurality of virtual reality and augmented reality devices 108.

The interactive computing environment 100 includes the plurality of users 102. In addition, each of the plurality of users 102 may be any person or individual accessing the corresponding communication device of the one or more communication devices 104. In an embodiment of the present disclosure, the plurality of users 102 is owner of the one or more communication devices 104. In another embodiment of the present disclosure, the plurality of users 102 is not the owner of the one or more communication devices 104. In an embodiment of the present disclosure, the plurality of users 102 accesses the one or more communication devices 104 at home. In another embodiment of the present disclosure, the plurality of users 102 accesses the one or more communication devices 104 at a cafe. In yet another embodiment of the present disclosure, the plurality of users 102 accesses the one or more communication devices 104 at office. In an example, a user U1 accesses a smartphone S1 while sitting in a living room. In another example, a user U2 accesses a laptop L2 while travelling from one place to another. In yet another example, a user U3 accesses a desktop computer D3 while working at office.

The plurality of users 102 corresponds to any number of person or individual associated with the visualization based onboarding system 112. The visualization based onboarding system 112 allows each of the plurality of users 102 to access the virtual reality and augmented reality model through the plurality of virtual reality and augmented reality devices 108. In an example, a user U1 accesses loan options (let's say car loans) of a financial institution F1 through a virtual reality and augmented reality device V1. In another example, a user U2 accesses account opening services S2 (let's say a saving account for an individual without a nominee) of a financial institution F2 through a virtual reality and augmented reality device V2. In yet another example, a user U3 applies for a credit card C3 of a financial institution F3 through a virtual reality and augmented reality device V3. In yet another example, a user U4 enquires for money exchange (let's say from dollars to Euro) of a financial institution F4 through a virtual reality and augmented reality device V4.

In addition, the plurality of users 102 uploads a plurality of documents required for onboarding process for the plurality of financial services of the one or more financial institutions through the one or more communication devices 104. Further, the plurality of documents includes proof of identity, proof of address, photographs, online banking forms, proof of age, proof of income source, and the like. Furthermore, the plurality of users 102 navigate inside a virtual reality representation to upload the plurality of documents on the plurality of virtual reality and augmented reality devices 108.

The interactive computing environment 100 includes the one or more communication devices 104. The plurality of users 102 is connected with the interactive computing environment 100 through the one or more communication devices 104. In an embodiment of the present disclosure, the one or more communication devices 104 facilitate access to the visualization based onboarding system 112. In an embodiment of the present disclosure, each of the one or more communication devices 104 is a portable communication device. The portable communication device includes but may not be limited to a laptop, smartphone, tablet, and smart watch. In an example, the smartphone may be an iOS-based smartphone, an android-based smartphone, a windows-based smartphone and the like. In another embodiment of the present disclosure, each of the one or more communication devices 104 is a fixed communication device. The fixed communication device includes but may not be limited to desktop, workstation, smart TV and mainframe computer. In an embodiment of the present disclosure, the one or more communication devices 104 are currently in switched-on state. The one or more communication devices 104 are any type of devices having active internet connection. In addition, each of the plurality of users 102 accesses corresponding communication device of the one or more communication devices 104 in real-time.

In an embodiment of the present disclosure, the one or more communication devices 104 perform computing operations based on a suitable operating system installed inside the one or more communication devices 104. In general, operating system is system software that manages computer hardware and software resources and provide common services for computer programs. In addition, the operating system acts as an interface for software installed inside the one or more communication devices 104 to interact with hardware components of the one or more communication devices 104. In an embodiment of the present disclosure, each of the one or more communication devices 104 perform computing operations based on any suitable operating system designed for the portable communication device. In an example, the operating system installed inside the one or more communication devices 104 is a mobile operating system. Further, the mobile operating system includes but may not be limited to windows operating system, android operating system, iOS operating system, symbian operating system, bada operating system from Samsung, BlackBerry operating system, and sailfish. In an embodiment of the present disclosure, the one or more communication devices 104 operate on any version of particular operating system corresponding to above mentioned operating systems.

In another embodiment of the present disclosure, the one or more communication devices 104 perform computing operations based on any suitable operating system designed for fixed communication device. In an example, the operating system installed inside the one or more communication devices 104 is windows. In another example, the operating system installed inside the one or more communication devices 104 is Mac. In yet another example, the operating system installed inside the one or more communication devices 104 is Linux based operating system. In yet another example, the operating system installed inside the one or more communication devices 104 is Chrome OS. In yet another example, the operating system installed inside the one or more communication devices 104 may be one of UNIX, *Kali* Linux, and the like. However, the operating system is not limited to above mentioned operating systems.

In an embodiment of the present disclosure, the one or more communication devices 104 operate on any version of windows operating system. In another embodiment of the present disclosure, the one or more communication devices 104 operate on any version of Mac operating system. In yet another embodiment of the present disclosure, the one or more communication devices 104 operate on any version of Linux operating system. In yet another embodiment of the present disclosure, the one or more communication devices 104 operates on any version of Chrome OS. In yet another embodiment of the present disclosure, the one or more communication devices 104 operates on any version of particular operating system corresponding to above mentioned operating systems.

In an embodiment of the present disclosure, the one or more communication devices 104 are interconnected with the plurality of virtual reality and augmented reality devices 108 and the visualization based onboarding system 112. The interconnection allows the plurality of users 102 to access the virtual reality and augmented reality model and upload the plurality of documents for the plurality of financial services.

The interactive computing environment 100 includes the one or more communication devices 104. The one or more communication devices 104 provide an interface for the plurality of users 102 to interact with the interactive computing environment 100. The plurality of users 102 can interact with the interactive computing environment 100 through more than one device of the one or more communication devices 104. In an example, a user U1 connects with the interactive computing environment 100 through a communication device D1 (let's say a smartphone) to open a saving account with a financial institution F1 at home. In another example, a user U2 connects with the computing environment 100 through a communication device D2 (let's say a desktop computer) to upload identity proof for credit card services of a financial institution F2 at home. In yet another example, the user U3 connects with the computing environment 100 with a communication device D3 (let's say a tablet) for applying car loan from a financial institution F3 while travelling.

Each of the one or more communication devices 104 comprises of a memory. In general, memory includes computer-storage media in the form of volatile and/or nonvolatile memory. The memory may be removable, non-removable, or a combination thereof. Exemplary hardware devices include solid-state memory, hard drives, optical-disc drives, etc. The memory is coupled with one or more processors. In general, the one or more processor read data from various entities such as memory or I/O components. The one or more processor execute one or more instructions which are stored in the memory. The one or more processors provide execution method for one or more instructions provided by the visualization based onboarding system 112.

The interactive computing environment 100 includes the communication network 106. The one or more communication devices 104, the plurality of virtual reality and augmented reality devices 108, and the plurality of media devices 110 are connected to the communication network 106. The communication network 106 provides a medium for the plurality of users 102 to access the plurality of financial services through the one or more communication devices 104 and the plurality of virtual reality and augmented reality devices 108. The communication network 106 provides the medium for the plurality of users 102 to connect with the visualization based onboarding system 112. In an embodiment of the present disclosure, the communication network 106 is an internet connection. In another embodiment of the present disclosure, the communication network 106 is a wireless mobile network. In yet another embodiment of the present disclosure, the communication network 106 is a wired network with a finite bandwidth. In yet another embodiment of the present disclosure, the communication network 106 is a combination of the wireless and the wired network for the optimum throughput of data transmission. In yet another embodiment of the present disclosure, the communication network 106 is an optical fiber high bandwidth network that enables a high data rate with negligible connection drops. The communication network 106 includes a set of channels. Each channel of the set of channels supports a finite bandwidth. Moreover, the finite bandwidth of each channel of the set of channels is based on capacity of the communication network 106. The communication network 106 connects the one or more communication devices 104 to the visualization based onboarding system 112 using a plurality of methods. The plurality of methods used to provide network connectivity to the one or more communication devices 104 includes 2G, 3G, 4G, 5G, Wifi and the like.

The interactive computing environment 100 includes the plurality of virtual reality and augmented reality devices 108. In an embodiment of the present disclosure, the one or more communication devices 104 are connected with the plurality of virtual reality and augmented reality devices 108. Further, the plurality of virtual reality and augmented reality devices 108 include a plurality of devices that provide virtual reality and augmented reality experience to the plurality of users 102. The plurality of virtual reality and augmented reality devices 108 are connected by a processing device. The processing device provides power to the plurality of virtual reality and augmented reality devices 108 to operate. The plurality of virtual reality and augmented reality devices 108 may or may not be powered by the processing device. In an embodiment of the present disclosure, the plurality of virtual reality and augmented reality devices 108 work independently without the need to be powered by the processing device.

In addition, the plurality of virtual reality and augmented reality devices 108 includes a wearable device and a handheld device. However, the plurality of virtual reality and augmented reality devices 108 is not limited to specified devices. In an embodiment of the present disclosure, the plurality of virtual reality and augmented reality devices 108 includes the plurality of devices that are capable to provide virtual reality experience and augmented reality experience to the plurality of users 102. In an embodiment of the present disclosure, the plurality of virtual reality and augmented reality devices 108 may include a plurality of the wearable device and a plurality of the handheld device. In another embodiment of the present disclosure, the plurality of virtual reality and augmented reality devices 108 may include either the plurality of wearable devices or the plurality of handheld devices.

In an embodiment of the present disclosure, the wearable device is a device that is worn around the eyes of a user of the plurality of users 102. The wearable device covers eyes of the user completely to display a virtual environment of the one or more financial institutions. The user feels to be completely immersed in a virtual reality and augmented reality representation through the wearable device. Also, the wearable device may or may not provide rich sound experience to the user. The plurality of users 102 indulge into the virtual environment created by the virtual reality and augmented reality representation using the wearable device. The wearable device includes but may not be limited to head-mounted display. In an example, the wearable device is head-mounted display device. Further, the wearable device allows the plurality of users 102 to experience virtual reality and augmented reality in real-time. In an example, the head-mounted display device is worn around the eyes of the plurality of users 102 similar to binoculars. In an example, the head-mounted display device includes but may not be limited to Google Cardboard and HTC Vive.

In addition, the plurality of virtual reality and augmented reality devices 108 includes the handheld device. In an embodiment of the present disclosure, the handheld device is worn around hand of the user of the plurality of users 102. In another embodiment of the present disclosure, the handheld device is held in hands of the user like a remote. The handheld device is used by the user to control and navigate around the virtual reality and augmented reality representation. The plurality of users 102 control and move the handheld device to navigate around the virtual reality and augmented reality representation. The navigation may be made using specific buttons embedded inside the handheld device.

In an embodiment of the present disclosure, the handheld device includes a plurality of sensors along with buttons.

The handheld device projects a beam using gestures in the virtual reality and augmented reality representation. The projected beam helps the plurality of users 102 to select different options and navigate around in the virtual reality and augmented reality representation.

In an embodiment of the present disclosure, the plurality of virtual reality and augmented reality devices 108 may include a data glove. In general, the data glove is an interactive device which resembles a glove worn on the hand. Further, the data glove facilitates tactile sensing and fine-motion control in robotics and virtual reality. Also, the data glove is one of several types of electromechanical devices used in haptic applications. The data glove senses objects present in the virtual reality and augmented reality representation. The data glove includes the plurality of sensors to provide rich and enhanced virtual reality and augmented reality representation to the plurality of users 102. The plurality of users 102 senses and feels any object present in the virtual reality and augmented reality representation as if it is present in reality using the data glove.

In an example, a user U1 wears the data glove inside the virtual reality and augmented reality representation of a financial institution F1. The user U1 is able to feel the objects present in the virtual reality and augmented reality representation as if the objects are present in reality. Although the objects are not present in reality but only can be seen virtually. In an example, a user U1 views a cash counter in front of his eyes in the virtual reality and augmented reality representation of the financial institution F1. The user U1 may feel the texture, distance and quality of the cash counter using the data glove in the virtual reality and augmented reality representation.

In an embodiment of the present disclosure, the wearable device is connected with the handheld device. The wearable device is connected wirelessly with the handheld device. In another embodiment of the present disclosure, the wearable device is connected using a wired connection with the handheld device.

The interactive computing environment 100 includes the plurality of media devices 110. The plurality of media devices 110 supports various multimedia content. The one or more financial institutions uploads a set of data in real-time essential for creating the virtual reality and augmented reality model using the virtual reality and augmented reality representation through the plurality of media devices 110. In an embodiment of the present disclosure, each of the plurality of media devices 110 captures a plurality of parameters using the set of data of the one or more financial institutions. In addition, the plurality of parameters of the one or more financial institutions includes one or more institution environment essentials, a plurality of architectural information, and the plurality of financial services. Further, the set of data in in a plurality of forms. Furthermore, the plurality of forms may include but not be limited to images, audios, videos, drawings, 3-dimensional models, and text. The plurality of forms is in one or more formats. The one or more formats may include but not be limited to joint photographic experts group, portable network graphics, matroska, moving pictures expert group, stereolithography, object file, and musical instrument digital interface.

In an embodiment of the present disclosure, the set of data for the plurality of media devices 110 is in form of a video stream. In another embodiment of the present disclosure, the set of data for the plurality of media devices 110 is in form of a live video stream being recorded by camera of the plurality of media devices 110. In another embodiment of the present disclosure, the set of data for the plurality of media devices 110 is in form of live multimedia stream being recorded on the plurality of media devices 110. In yet another embodiment of the present disclosure, the set of data for the plurality of media devices 110 is in form of an audio clip. In yet another embodiment of the present disclosure, the set of data for the plurality of media devices 110 is in form of a PowerPoint presentation. In yet another embodiment of the present disclosure, the set of data for the plurality of media devices 110 is in another suitable form. The visualization based onboarding system 112 receives the set of data from the plurality of media devices 110.

In addition, each of the plurality of media devices 110 includes a dedicated software platform to enable real-time uploading of the set of data essential for creating the virtual reality and augmented reality model. The dedicated software platform enables the plurality of media devices 110 to connect with the visualization based onboarding system 112. In an embodiment of the present disclosure, the dedicated software platform is an application installed in the plurality of media devices 110. In an embodiment of the present disclosure, the plurality of media devices 110 includes a web based browser to connect with the visualization based onboarding system 112. In another embodiment of the present disclosure, the plurality of media devices 110 includes any other software platform to connect with the visualization based onboarding system 112. The plurality of media devices 110 serves as a platform of the interactive computing environment 100 to receive information of the one or more financial institutions in real-time. The information of the one or more financial institutions is accessible through the dedicated software platform. The plurality of media devices 110 is connected to the communication network 108.

The interactive computing environment 100 includes the visualization based onboarding system 112 which is associated with the one or more financial institutions and the plurality of users 102. In addition, the visualization based onboarding system 112 maps the set of data of the one or more financial institutions. Further, the visualization based onboarding system 112 creates the virtual reality and augmented reality model using the virtual reality and augmented reality representation of the one or more financial institutions.

Furthermore, the visualization based onboarding system 112 allows the plurality of users 102 to navigate inside the virtual reality and augmented reality model of the one or more financial institutions. Moreover, the visualization based onboarding system 112 enables the plurality of users to upload the plurality of documents through the one or more communication devices for the plurality of financial services. Also, the visualization based onboarding system 112 enables the plurality of users 102 to navigate the virtual reality and augmented reality representation. Also, the visualization based onboarding system 112 enables the plurality of users 102 to interact with the plurality of financial services. Also, the visualization based onboarding system 112 enables the plurality of users 102 to interact with a plurality of financing officials working in the one or more financial institutions using augmented reality concept. Also, the visualization based onboarding system 112 allows the one or more financial institutions to increase productivity and easy onboarding of the plurality of users 102.

The visualization based onboarding system 112 collects a first set of data associated with the one or more institution environment essentials of the one or more financial institutions. In general, the one or more institution environment essentials are the necessary interior elements of the one or more financial institutions. In an embodiment of the present disclosure, the first set of data includes wall units, wall finishing, roofing, basic building, electrical connections, electronic components, flooring, doors, and service counters. In another embodiment of the present disclosure, the first set of data includes furniture, paints, sanitary fittings, physical items, decorative, hardware and the like. The one or more institution environment essentials are obtained from the plurality of media devices 110 with one or more properties. Further, the one or more properties is associated with the one or more institution environment essentials. In an embodiment of the present disclosure, the one or more properties include brand, model, size, colour, type, finish, weight, quality, material, specifications, designs, shapes, dimensions, and the like.

The visualization based onboarding system 112 obtains a second set of data associated with the plurality of architectural information of the one or more financial institutions. In addition, the plurality of architectural information of the one or more financial institutions is obtained from the plurality of media devices 110. Further, the plurality of media devices 110 is associated with the one or more financial institutions. Furthermore, the visualization based onboarding system 112 obtains the second set of data in real-time. The plurality of architectural information of the one or more financial institutions includes building information modelling documents, blueprint, layout, pattern information, framing plan, and the like. In an embodiment of the present disclosure, the plurality of architectural information includes sub-floor plan, roof plans, specification drawings, two dimensional orthogonal projections of financial institute, and the like. In another embodiment of the present disclosure, the plurality of architectural information includes sections, elevations, interior plan, exterior plan, and the like.

The visualization based onboarding system 112 receives a third set of data associated with the plurality of financial services of the one or more financial institutions. In addition, the plurality of financial services of the one or more financial institutions is received from the plurality of media devices 110. Further, the plurality of media devices 110 is associated with the one or more financial institutions. In an embodiment of the present disclosure, the third set of data includes general enquiry services, car loan services, house loan services, education loan services, net banking services, and the like. In another embodiment of the present disclosure, the third set of data includes commercial banking services, opening saving accounts, home equity, stock exchange investment, opening accounts, and the like. In yet another embodiment of the present disclosure, the third set of data includes documents verification services, overdraft facility, credit card services, fixed deposit services, and the like. In yet another embodiment of the present disclosure, the third set of data includes health insurance services, personal accident insurance, retirement plan services, risk management services, and the like. The visualization based onboarding system 112 receives the third set of data in real-time.

The visualization based onboarding system 112 maps the first set of data associated with the one or more institution environment essentials, the second set of data associated with the plurality of architectural information and the third set of data associated with the plurality of financial services. The visualization based onboarding system 112 maps the first set of data, the second set of data, and the third set of data to create the virtual reality and augmented reality representation of the one or more financial institutions. In an embodiment of the present disclosure, the facility visualization system 110 maps the first set of data, the second set of data, and the third set of data based on one or more options. The one or more options include but may not be limited to user preference of the plurality of financial services, selection of the one or more institution environment essentials and properties of the plurality of architectural information. The visualization based onboarding system 112 maps the first set of data, the second set of data and the third set of data in real-time.

The visualization based onboarding system 112 creates the virtual reality and augmented reality model using the virtual reality and augmented reality representation of the one or more financial institutions. The virtual reality and augmented reality model is created for interaction of the plurality of users 102 with the one or more financial institutions. The plurality of users 102 is associated with the one or more communication devices 104 and the plurality of virtual reality and augmented reality devices 108. In addition, the virtual reality and augmented reality model of the one or more financial institutions is based on the first set of data, the second set of data and the third set of data. In an embodiment of the present disclosure, the one or more financial institutions create the virtual reality and augmented reality representation at the visualization based onboarding system 112. In another embodiment of the present disclosure, the visualization based onboarding system 112 may automatically create the virtual reality and augmented reality representation of the one or more financial institutions in real-time.

In an embodiment of the present disclosure, the plurality of users 102 uses the plurality of virtual reality and augmented reality devices 108 to view the virtual reality representation of the one or more financial institutions. The visualization based onboarding system 112 maps the first set of data, the second set of data, and the third set of data to create the virtual reality and augmented reality representation of the one or more financial institutions. Also, the plurality of virtual reality and augmented reality devices 108 is required to view the one or more financial institutions in virtual reality and augmented reality. Also, the plurality of virtual reality and augmented reality devices 108 is powered by the processing device. The plurality of users 102 wears the wearable device to view the one or more financial institutions in virtual reality.

In an embodiment of the present disclosure, the visualization based onboarding system 112 allows the plurality of users 102 to choose a financial service of the plurality of the financial services. The plurality of users 102 chooses the financial service through the plurality of virtual reality and augmented reality devices 108. The financial service is displayed to the plurality of users 102 in the virtual reality and augmented reality representation. The plurality of users 102 is allowed to choose more than one financial services of the plurality of financial services in real-time. In another embodiment of the present disclosure, the visualization based onboarding system 112 recommends the financial service of the plurality of financial services to the plurality of users 102 using hardware run machine learning algorithms. The visualization based onboarding system 112 adapts to behaviour of each of the plurality of users 102.

In an embodiment of the present disclosure, the visualization based onboarding system 112 projects a real environment of the one or more financial institutions on the one or more virtual reality and augmented reality devices 108 as a three-dimensional virtual space. In addition, each of the plurality of users 102 experiences real environment of the one or more financial institutions on the plurality of virtual reality and augmented reality devices 108 as the three-dimensional virtual space.

The visualization based onboarding system 112 allows the plurality of users 102 to navigate and interact inside the virtual reality and augmented reality representation. The plurality of users 102 is allowed to navigate and interact with the plurality of financing officials for the plurality of financial services of the one or more financial institutions. The navigation is done by surfing through the plurality of financial services displayed on the plurality of virtual reality and augmented reality devices 108 in the virtual reality and augmented reality representation. The plurality of virtual reality and augmented reality devices 108 is used to allow interaction, navigation and customization in the virtual reality and augmented reality representation in real-time. The plurality of users 102 navigates and interacts inside the virtual reality and augmented reality representation of the one or more financial institutions in real-time.

The visualization based onboarding system 112 allows the plurality of users 102 to navigate and interact inside the virtual reality and augmented reality representation using the plurality of the handheld devices. The plurality of users 102 holds the handheld device in hand and selects the financial service of the plurality of financial services using the handheld device. The handheld device is used to navigate inside the virtual reality and augmented reality representation. The handheld device is used to make selections inside the virtual reality and augmented reality representation. In an embodiment of the present disclosure, the visualization based onboarding system 112 displays the virtual reality and augmented reality model on the plurality of virtual reality and augmented reality devices 108. In an example, a user U1 selects a financial service F1 (let's say a current account opening) using a handheld device D1 for a virtual reality and augmented reality model M1 of a financial institute I1.

In an embodiment of the present disclosure, the visualization based onboarding system 112 displays the selected financial service of the plurality of services on the one or more communication devices 104. Also, the visualization based onboarding system 112 provides information of cost of the plurality of financial services which is displayed on the one or more communication devices 104. Also, the visualization based onboarding system 112 requests for the plurality of documents for the plurality of financial services which is displayed on the one or more communication devices 104.

The visualization based onboarding system 112 allows the plurality of users 102 to navigate inside the virtual reality and augmented reality model of the one or more financial institutions. In addition, the visualization based onboarding system 112 facilitates the plurality of users 102 to access the one or more services offered by the one or more financial institutions on the one or more virtual reality and augmented reality devices 108. Further, the plurality of virtual reality and augmented reality devices 108 allows interaction, navigation and customization of the virtual reality and augmented reality model of the one or more financial institutions in real-time. The plurality of virtual reality and augmented reality devices 108 used to display the virtual reality and augmented reality model includes Microsoft Hololens, Meta 2, Smart Glasses like Google glass and the like.

In an embodiment of the present disclosure, the plurality of users 102 interacts, navigates and customizes the virtual reality and augmented reality representation using hand gestures and audio commands. In another embodiment of the present disclosure, the plurality of users 102 interacts, navigates and customizes mixed reality representation using hand gestures and audio commands. In an example, hand gestures include gesture such as tapping in air by a user U1. In another example, hand gestures include gesture such as waving hand in air by a user U2. In an example, audio commands include command such as saying "give me the first option" for selecting home loan as shown in services. However, hand gestures and audio commands are not limited to above mentioned gestures and commands.

In an example, a user U1 opens an account A1 (let's say a saving account) on a virtual reality and augmented reality device D1 using voice command. In another example, a user U2 requests for a credit card C2 on a virtual reality and augmented reality device D1 using hand gestures.

Further, the interactive computing environment 100 includes the server 114 and the database 116. The visualization based onboarding system 112 is associated with the server 114. In general, server is a computer program or device that provides functionality for other programs or devices. The server 114 provides various functionalities, such as sharing data or resources among multiple clients, or performing computation for a client. However, those skilled in the art would appreciate that the visualization based onboarding system 112 is connected to more number of servers. Furthermore, it may be noted that the server 114 includes the database 116. However, those skilled in the art would appreciate that more number of the servers include more numbers of databases.

In an embodiment of the present disclosure, the visualization based onboarding system 112 is located in the server 114. In another embodiment of the present disclosure, the visualization based onboarding system 112 is connected with the server 114. In yet another embodiment of the present disclosure, the visualization based onboarding system 112 is a part of the server 114. The server 114 handles each operation and task performed by the visualization based onboarding system 112. The server 114 stores one or more instructions for performing the various operations of the visualization based onboarding system 112. The server 114 is located remotely from one or more sellers. The server 114 is associated with an administrator. In general, administrator manages different components in the visualization based onboarding system 112. The administrator coordinates the activities of components involved in the visualization based onboarding system 112. The administrator is any person or individual who monitors working of the visualization based onboarding system 112 and the server 114 in real time. The administrator monitors working of the visualization based onboarding system 112 and the server 114 through a communication device. The communication device includes the laptop, the desktop computer, the tablet, a personal digital assistant and the like.

The database 116 stores different sets of information associated with various components of the visualization based onboarding system 112. In general, the database 116 is used to hold general information and specialized data, such as characteristics data of the plurality of users 102, data of the one or more communication devices 104, data of the plurality of media devices 110 and the like. In an example, the database 116 includes characteristic data of the plurality of users 102 and pre-defined instructions. The database 116 stores information of the one or more financial institutions, the one or more communication devices 104, profiles of the plurality of users 102, demographic information of the plurality of users 102 and the like. The database 116 organizes the data using models such as relational models or hierarchical models. Further, the database 116 stores data provided by the one or more financial institutions.

FIGS. 2A and 2B illustrate a flow chart 200 of the method for onboarding users for financial institutions using virtual reality and augmented reality, in accordance with various embodiments of the present disclosure. It may be noted that in order to explain the method steps of the flowchart 200, references will be made to the elements explained in FIG. 1.

The flow chart 200 initiates at step 202. At step 204, the visualization based onboarding system 112 collects the first set of data associated with the one or more institution environment essentials. At step 206, the visualization based onboarding system 112 obtains the second set of data associated with the plurality of architectural information. At step 208, the visualization based onboarding system 112 receives the third set of data associated with the plurality of financial services. At step 210, the visualization based onboarding system 112 maps the first set of data, the second set of data and the third set of data associated with the one or more financial institutions. At step 212, the visualization based onboarding system 112 creates the virtual reality and augmented reality model of the one or more financial institutions. At step 214, the visualization based onboarding system 112 allows the plurality of users 102 to navigate inside the virtual reality and augmented reality model.

The flow chart 200 terminates at step 216. It may be noted that the flowchart 200 is explained to have above stated process steps; however, those skilled in the art would appreciate that the flowchart 200 may have more/less number of process steps which may enable all the above stated embodiments of the present disclosure.

FIG. 3 illustrates the block diagram of a computing device 300, in accordance with various embodiments of the present disclosure. The computing device 300 includes a bus 302 that directly or indirectly couples the following devices: memory 304, one or more processors 306, one or more presentation components 308, one or more input/output (I/O) ports 310, one or more input/output components 312, and an illustrative power supply 314. The bus 302 represents what may be one or more busses (such as an address bus, data bus, or combination thereof). Although the various blocks of FIG. 3 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 3 is merely illustrative of an exemplary computing device 300 that can be used in connection with one or more embodiments of the present invention. Distinction is not made between such categories as "workstation," "server," "laptop," "hand-held device," etc., as all are contemplated within the scope of FIG. 3 and reference to "computing device."

The computing device 300 typically includes a variety of computer-readable media. The computer-readable media can be any available media that can be accessed by the computing device 300 and includes both volatile and non-volatile media, removable and non-removable media. By way of example, and not limitation, the computer-readable media may comprise computer storage media and communication media. The computer storage media includes volatile and non-volatile, removable and non-removable media implemented in any method or technology for storage of information such as computer-readable instructions, data structures, program modules or other data.

The computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 300. The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 304 includes computer-storage media in the form of volatile and/or nonvolatile memory. The memory 304 may be removable, non-removable, or a combination thereof. Exemplary hardware devices include solid-state memory, hard drives, optical-disc drives, etc. The computing device 300 includes one or more processors that read data from various entities such as memory 304 or I/O components 312. The one or more presentation components 308 present data indications to a user or other device. Exemplary presentation components include a display device, speaker, printing component, vibrating component, etc. The one or more I/O ports 310 allow the computing device 300 to be logically coupled to other devices including the one or more I/O components 312, some of which may be built in. Illustrative components include a microphone, joystick, game pad, satellite dish, scanner, printer, wireless device, etc.

The present disclosure has numerous disadvantages over the prior art. The present disclosure provides a method and system to enable interaction of the plurality of users with the plurality of financing officials working in the one or more financial institutions using the virtual reality and augmented reality model. The disclosure provides the method and system to enable the plurality of users to navigate the plurality of financial services using the virtual reality and augmented reality model. The disclosure provides the method and system to enable the plurality of users to upload the plurality of documents for the plurality of financial services using the virtual reality and augmented reality model. The disclosure provides a cost efficient and time saving solution for the plurality of users to interact with the one or more financial institutions for the plurality of services.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the invention have been described above and illustrated in some cases, it should be interpreted and understood as to have been presented only by way of illustration and example, but not by limitation. Thus, the breadth and scope of a preferred embodiment should not be limited by any of the above-described exemplary embodiments.

What is claimed:

1. A computer implemented method for onboarding users for financial institutions using virtual reality and augmented reality, the computer-implemented method comprising:

collecting, at a visualization based onboarding system with a processor, a first set of data associated with one or more institution environment essentials, wherein the one or more institution environment essentials are collected from a plurality of media devices with one or more properties, wherein the plurality of media devices is associated with one or more financial institutions, wherein the first set of data is collected in real-time;

obtaining, at the visualization based onboarding system with the processor, a second set of data associated with a plurality of architectural information of the one or more financial institutions, wherein the plurality of architectural information of the one or more financial institutions is obtained from the plurality of media devices, wherein the plurality of media devices is associated with the one or more financial institutions, wherein the second set of data is obtained in real-time;

receiving, at the visualization based onboarding system with the processor, a third set of data associated with a plurality of financial services of the one or more financial institutions, wherein the plurality of financial services of the one or more financial institutions is received from the plurality of media devices, wherein the plurality of media devices is associated with the one or more financial institutions, wherein the third set of data is received in real-time;

mapping, at the visualization based onboarding system with the processor, the first set of data associated with the one or more institution environment essentials, the second set of data associated with the plurality of architectural information and the third set of data associated with the plurality of financial services, wherein the mapping is done to create a virtual reality and augmented reality representation of the one or more financial institutions, wherein the mapping of the first set of data, the second set of data and the third set of data is done in real-time;

creating, at the visualization based onboarding system with the processor, a virtual reality and augmented reality model using the virtual reality and augmented reality representation of the one or more financial institutions, wherein the virtual reality and augmented reality model is created for interaction of a plurality of users with the one or more financial institutions, wherein the plurality of users is associated with one or more communication devices and a plurality of virtual reality and augmented reality devices, wherein the virtual reality and augmented reality model is based on the first set of data, the second set of data and the third set of data, wherein the virtual reality and augmented reality model is created in real-time; and allowing, at the visualization based onboarding system with the processor, the plurality of users to navigate inside the virtual reality and augmented reality model of the one or more financial institutions, wherein the navigation facilitates the plurality of users to access the one or more services offered by the one or more financial institutions on the plurality of virtual reality and augmented reality devices, wherein the plurality of virtual reality and augmented reality devices allows interaction, navigation and customization of the virtual reality and augmented reality model of the one or more financial institutions in real-time.

2. The computer-implemented method as recited in claim 1, wherein the first set of data is associated with the one or more institution environment essentials, wherein the first set of data comprises wall units, wall finishing, roofing, basic building, electrical connections, electronic components, flooring, doors, service counters, furniture, paints, sanitary fittings, physical items, decorative and hardware.

3. The computer-implemented method as recited in claim 1, wherein the one or more properties are associated with the one or more institution environment essentials, wherein the one or more properties comprise brand, model, size, colour, type, finish, weight, quality, material, specifications, designs, shapes, and dimensions.

4. The computer-implemented method as recited in claim 1, wherein the second set of data is associated with the plurality of architectural information of the one or more financial institutions, wherein the plurality of architectural information of the one or more financial institutions comprises building information modelling documents, blueprint, layout, pattern information, framing plan, sub-floor plan, roof plans, specification drawings, two dimensional orthogonal projections of financial institute, sections, elevations, interior plan, and exterior plan.

5. The computer-implemented method as recited in claim 1, wherein the third set of data is associated with the plurality of financial services of the one or more financial institutions, wherein the third set of data comprises general enquiry services, car loan services, house loan services, education loan services, net banking services, commercial banking services, opening saving accounts, home equity, stock exchange investment, opening accounts, documents verification services, overdraft facility, credit card services, fixed deposit services, health insurance services, personal accident insurance, retirement plan services, and risk management services.

6. The computer-implemented method as recited in claim 1, further comprising projecting, at the visualization based onboarding system with the processor, a real environment of the one or more financial institutions on the plurality of virtual reality and augmented reality devices as a three-dimensional virtual space, wherein each of the plurality of users experiences the real environment of the one or more financial institutions on the plurality of virtual reality and augmented reality devices as the three-dimensional virtual space.

7. The computer-implemented method as recited in claim 1, wherein the plurality of virtual reality and augmented reality devices comprises a wearable device and a handheld device, wherein the wearable device provides the virtual reality and augmented reality representation as the three-dimensional virtual space to the plurality of users, wherein the handheld device allows the plurality of users to interact and navigate the three-dimensional virtual space and the plurality of financial services inside the virtual reality and augmented reality representation of the one or more financial institutions in real-time.

8. The computer-implemented method as recited in claim 1, wherein each of the plurality of users accesses the plurality of financial services associated with the one or more financial institutions, wherein the plurality of financial services is accessed by the plurality of users on the plurality of virtual reality and augmented reality devices projecting the real environment as the three-dimensional virtual space, wherein the plurality of users uploads a plurality of documents required for onboarding process for the one or more financial institutions in real time, wherein the plurality of documents comprises proof of identity, proof of address, photographs, online banking forms, proof of age, and proof of income source, wherein the plurality of users navigates inside the virtual reality and augmented reality representation to upload the plurality of documents on the plurality of virtual reality and augmented reality devices.

9. The computer-implemented method as recited in claim 1, wherein the plurality of virtual reality and augmented reality devices is interconnected with the one or more communication devices, wherein the one or more communication devices are associated with the plurality of users, wherein the plurality of users uploads the plurality of documents through the one or more communication devices while navigating the virtual reality and augmented reality representation and interacting with the plurality of financial services.

10. The computer-implemented method as recited in claim 1, wherein the plurality of users interacts with a plurality of financing officials working in the one or more financial institutions using augmented reality concept similar to the real environment in the virtual reality and augmented reality representation on the plurality of virtual reality and augmented reality devices.

11. A computer system comprising:
one or more processors; and
a memory coupled to the one or more processors, the memory for storing instructions which, when executed by the one or more processors, cause the one or more processors to perform a method and system for onboarding users for financial institutions using virtual reality and augmented reality, the method comprising:
collecting, at a visualization based onboarding system, a first set of data associated with one or more institution environment essentials, wherein the one or more institution environment essentials are collected from a plurality of media devices with one or more properties, wherein the plurality of media devices is associated with one or more financial institutions, wherein the first set of data is collected in real-time;
obtaining, at the visualization based onboarding system, a second set of data associated with a plurality of architectural information of the one or more financial institutions, wherein the plurality of architectural information of the one or more financial institutions is obtained from the plurality of media devices, wherein the plurality of media devices is associated with the one or more financial institutions, wherein the second set of data is obtained in real-time;
receiving, at the visualization based onboarding system, a third set of data associated with a plurality of financial services of the one or more financial institutions, wherein the plurality of financial services of the one or more financial institutions is received from the plurality of media devices, wherein the plurality of media devices is associated with the one or more financial institutions, wherein the third set of data is received in real-time;
mapping, at the visualization based onboarding system, the first set of data associated with the one or more institution environment essentials, the second set of data associated with the plurality of architectural information and the third set of data associated with the plurality of financial services, wherein the mapping is done to create a virtual reality and augmented reality representation of the one or more financial institutions, wherein mapping of the first set of data, the second set of data and the third set of data is done in real-time;
creating, at the visualization based onboarding system, a virtual reality and augmented reality model using the virtual reality and augmented reality representation of the one or more financial institutions, wherein the virtual reality and augmented reality model is created for interaction of a plurality of users with the one or more financial institutions, wherein the plurality of users is associated with one or more communication devices and a plurality of virtual reality and augmented reality devices, wherein the virtual reality and augmented reality model is based on the first set of data, the second set of data and the third set of data, wherein the virtual reality and augmented reality model is created in real-time; and
allowing, at the visualization based onboarding system, the plurality of users to navigate inside the virtual reality and augmented reality model of the one or more financial institutions, wherein navigation facilitates the plurality of users to access the one or more services offered by the one or more financial institutions on the plurality of virtual reality and augmented reality devices, wherein the plurality of virtual reality and augmented reality devices allows interaction, navigation and customization of the virtual reality and augmented reality model of the one or more financial institutions in real-time.

12. The computer system as recited in claim 11, wherein the first set of data is associated with the one or more institution environment essentials, wherein the first set of data comprises wall units, wall finishing, roofing, basic building, electrical connections, electronic components, flooring, doors, service counters, furniture, paints, sanitary fittings, physical items, decorative and hardware.

13. The computer system as recited in claim 11, wherein the one or more properties are associated with the one or more institution environment essentials, wherein the one or more properties comprise brand, model, size, colour, type, finish, weight, quality, material, specifications, designs, shapes, and dimensions.

14. The computer system as recited in claim 11, wherein the second set of data is associated with the plurality of architectural information of the one or more financial institutions, wherein the plurality of architectural information of the one or more financial institutions comprises building information modelling documents, blueprint, layout, pattern information, framing plan, sub-floor plan, roof plans, specification drawings, two dimensional orthogonal projections of financial institute, sections, elevations, interior plan, and exterior plan.

15. The computer system as recited in claim 11, wherein the third set of data is associated with the plurality of financial services of the one or more financial institutions, wherein the third set of data comprises general enquiry services, car loan services, house loan services, education loan services, net banking services, commercial banking services, opening saving accounts, home equity, stock exchange investment, opening accounts, documents verification services, overdraft facility, credit card services, fixed deposit services, health insurance services, personal accident insurance, retirement plan services, and risk management services.

16. The computer system as recited in claim 11, further comprising projecting, at the visualization based onboarding system, a real environment of the one or more financial institutions on the plurality of virtual reality and augmented reality devices as a three-dimensional virtual space, wherein each of the plurality of users experiences the real environment of the one or more financial institutions on the plurality of virtual reality and augmented reality devices as the three-dimensional virtual space.

17. The computer system as recited in claim 11, wherein the plurality of virtual reality and augmented reality devices comprises a wearable device and a handheld device, wherein the wearable device provides the virtual reality and augmented reality representation as the three-dimensional virtual space to the plurality of users, wherein the handheld device allows the plurality of users to interact and navigate the three-dimensional virtual space and the plurality of financial services inside the virtual reality and augmented reality representation of the one or more financial institutions in real-time.

18. The computer system as recited in claim 11, wherein each of the plurality of users accesses the plurality of financial services associated with the one or more financial institutions, wherein the plurality of financial services is accessed by the plurality of users on the plurality of virtual reality and augmented reality devices projecting the real environment as the three-dimensional virtual space, wherein the plurality of users uploads a plurality of documents required for onboarding process for the one or more financial institutions in real time, wherein the plurality of documents comprises proof of identity, proof of address, photographs, online banking forms, proof of age, and proof of income source, wherein the plurality of users navigates inside the virtual reality and augmented reality representation to upload the plurality of documents on the plurality of virtual reality and augmented reality devices.

19. The computer system as recited in claim 11, wherein the plurality of virtual reality and augmented reality devices is interconnected with the one or more communication devices, wherein the plurality of users uploads the plurality of documents through the one or more communication devices while navigating the virtual reality and augmented reality representation and interacting with the plurality of financial services, wherein the plurality of users interacts with a plurality of financing officials working in the one or more financial institutions using augmented reality concept similar to the real environment in the virtual reality and augmented reality representation on the plurality of virtual reality and augmented reality devices.

20. A non-transitory computer-readable storage medium encoding computer executable instructions that, when executed by at least one processor, performs a method and system for onboarding users for financial institutions using virtual reality and augmented reality, the method comprising:

collecting, at a computing device, a first set of data associated with one or more institution environment essentials, wherein the one or more institution environment essentials are collected from a plurality of media devices with one or more properties, wherein the plurality of media devices is associated with one or more financial institutions, wherein the first set of data is collected in real-time;

obtaining, at the computing device, a second set of data associated with a plurality architectural of information of the one or more financial institutions, wherein the plurality architectural of information of the one or more financial institutions is obtained from the plurality of media devices, wherein the plurality of media devices is associated with the one or more financial institutions, wherein the second set of data is obtained in real-time;

receiving, at the computing device, a third set of data associated with a plurality of financial services of the one or more financial institutions, wherein the plurality of financial services of the one or more financial institutions is received from the plurality of media devices, wherein the plurality of media devices is associated with the one or more financial institutions, wherein the third set of data is received in real-time;

mapping, at the computing device, the first set of data associated with the one or more institution environment essentials, the second set of data associated with the plurality of architectural information and the third set of data associated with the plurality of financial services, wherein the mapping is done to create a virtual reality and augmented reality representation of the one or more financial institutions, wherein mapping of the first set of data, the second set of data and the third set of data is done in real-time;

creating, at the computing device, a virtual reality and augmented reality model using the virtual reality and augmented reality representation of the one or more financial institutions, wherein the virtual reality and augmented reality model is created for interaction of a plurality of users with the one or more financial institutions, wherein the plurality of users is associated with one or more communication devices and a plurality of virtual reality and augmented reality devices, wherein the virtual reality and augmented reality model is based on the first set of data, the second set of data and the third set of data, wherein the virtual reality and augmented reality model is created in real-time; and allowing, at the computing device, the plurality of users to navigate inside the virtual reality and augmented reality model of the one or more financial institutions, wherein navigation facilitates the plurality of users to access the one or more services offered by the one or more financial institutions on the plurality of virtual reality and augmented reality devices, wherein the plurality of virtual reality and augmented reality devices allows interaction, navigation and customization of the virtual reality and augmented reality model of the one or more financial institutions in real-time.

* * * * *